(12) United States Patent
Goldenberg et al.

(10) Patent No.: US 7,346,429 B2
(45) Date of Patent: Mar. 18, 2008

(54) MOBILE ROBOT HYBRID COMMUNICATION LINK

(75) Inventors: Andrew A. Goldenberg, Toronto (CA); Pawel Kuzan, Oakville (CA); Lawrence Gryniewski, Mississauga (CA); Gordon D. Scott, Ottawa (CA)

(73) Assignee: Engineering Services, Inc., Toronto (CA)

( * ) Notice: Subject to any disclaimer, the term of this patent is extended or adjusted under 35 U.S.C. 154(b) by 871 days.

(21) Appl. No.: 10/838,913

(22) Filed: May 5, 2004

(65) Prior Publication Data

US 2005/0004708 A1    Jan. 6, 2005

Related U.S. Application Data

(60) Provisional application No. 60/467,550, filed on May 5, 2003.

(51) Int. Cl.
*G06F 19/00* (2006.01)

(52) U.S. Cl. .................. 700/245; 700/246; 700/250; 700/258; 700/259; 700/262; 318/568.11; 318/568.12; 318/568.13; 318/568.21; 318/568.25; 600/117; 600/118; 600/407; 600/429; 600/587; 606/102; 606/130; 606/139; 901/1; 901/2; 901/27; 901/36

(58) Field of Classification Search ................ 700/131, 700/132, 245, 246, 247, 248, 251, 253, 257, 700/258, 259, 260, 261, 262, 264; 606/1, 606/102, 130, 139; 318/568.11, 568.12, 318/568.13, 568.16, 568.21, 568.25; 600/117, 600/118, 407, 426, 429, 587, 595; 901/1, 901/2, 27, 36
See application file for complete search history.

(56) References Cited

U.S. PATENT DOCUMENTS

| | | | | |
|---|---|---|---|---|
| 5,021,878 A * | 6/1991 | Lang | .............................. | 901/1 |
| 5,142,803 A * | 9/1992 | Lang | ........................... | 40/411 |
| 5,198,893 A * | 3/1993 | Lang | ........................... | 348/61 |
| 5,289,273 A * | 2/1994 | Lang | .......................... | 348/121 |
| 5,544,649 A * | 8/1996 | David et al. | ............... | 600/301 |
| 6,773,344 B1 * | 8/2004 | Gabai et al. | .................. | 463/1 |
| 7,239,944 B2 * | 7/2007 | Dean | ........................... | 701/24 |

* cited by examiner

*Primary Examiner*—Thomas Black
*Assistant Examiner*—Marc McDieunel
(74) *Attorney, Agent, or Firm*—Nancy E. Hill; Hill & Schumacher

(57) ABSTRACT

A mobile robot communication system includes a remote unit, a repeater module and a control station. A cable connects the repeater module to the control station. The remote unit has a wireless receiver/transmitter for sending and receiving commands. The repeater module has a wireless receiver/transmitter for sending and receiving commands from the mobile unit. The control station is operable in communication with the repeater module for remotely sending and receiving signals. The cable is attached between the repeater module and control station for transmitting signals therebetween.

28 Claims, 5 Drawing Sheets

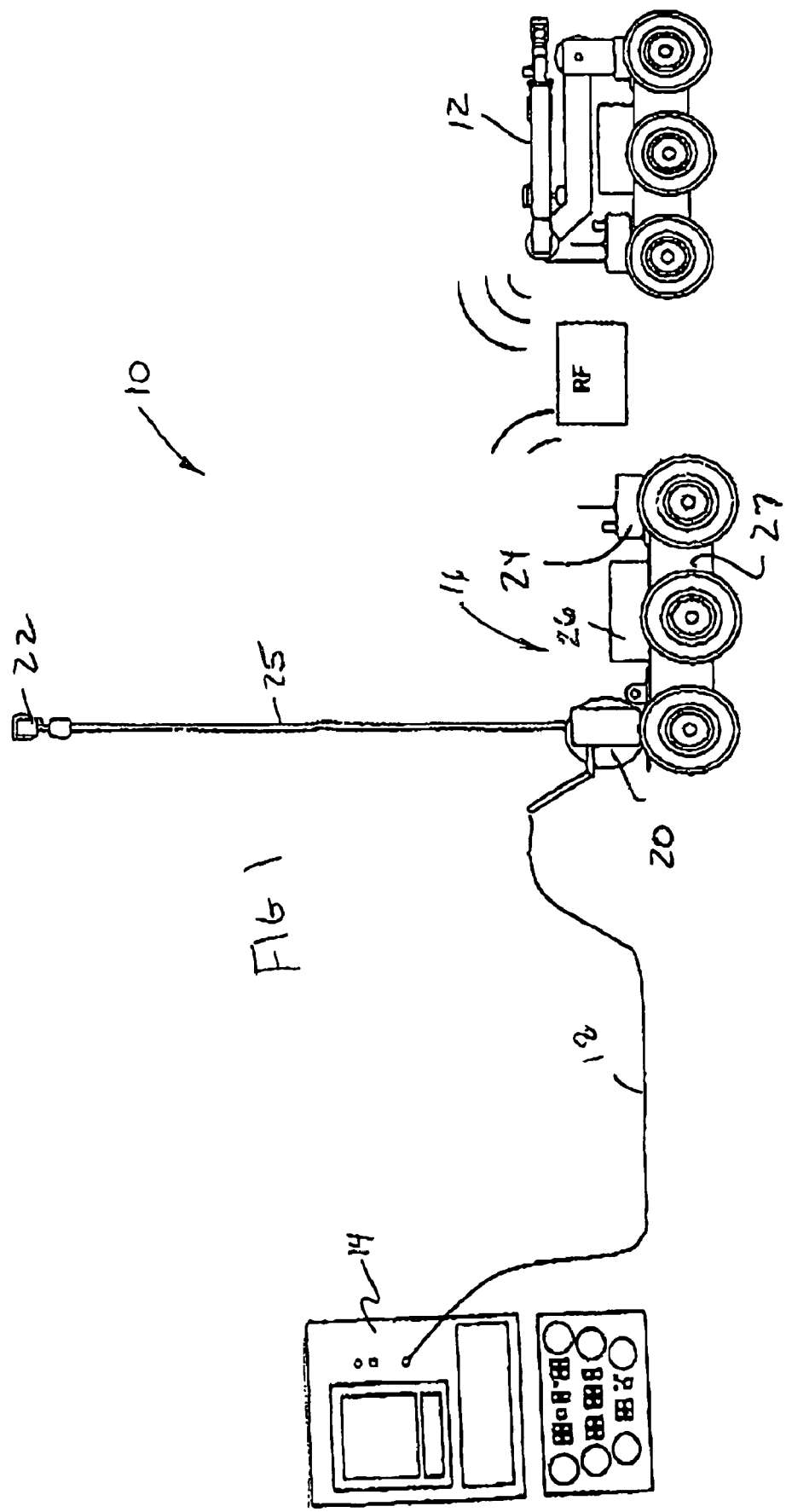

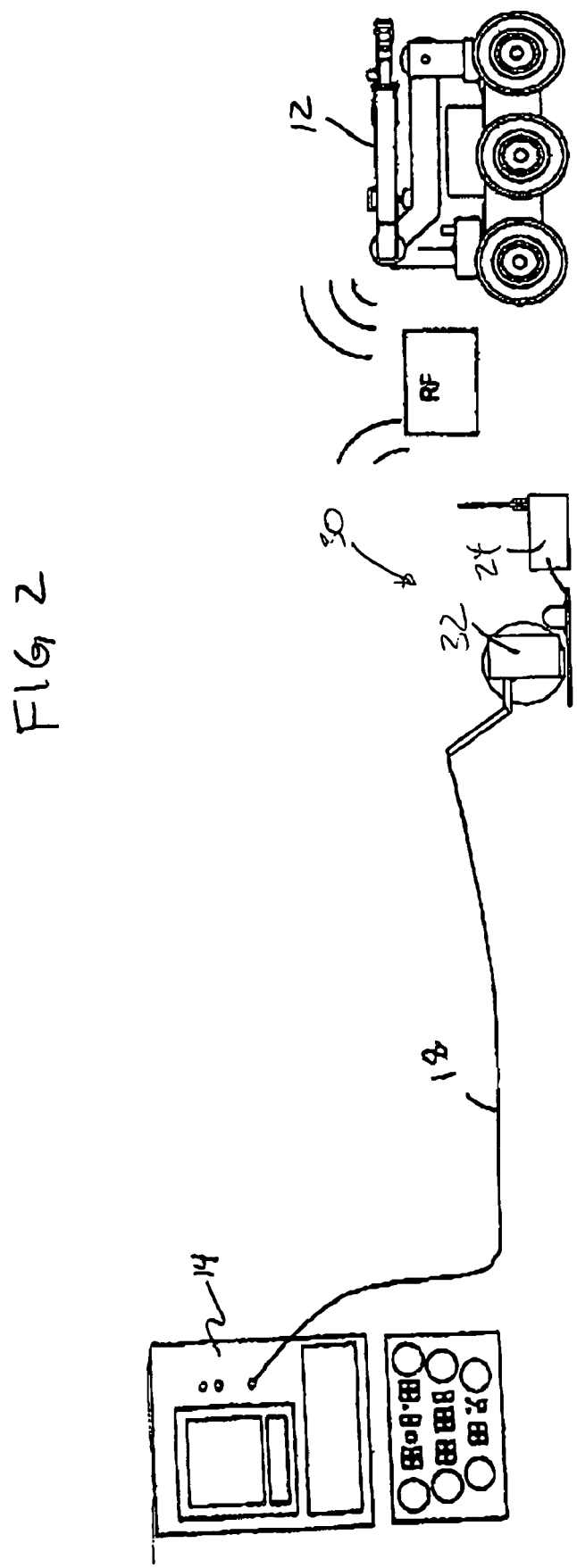

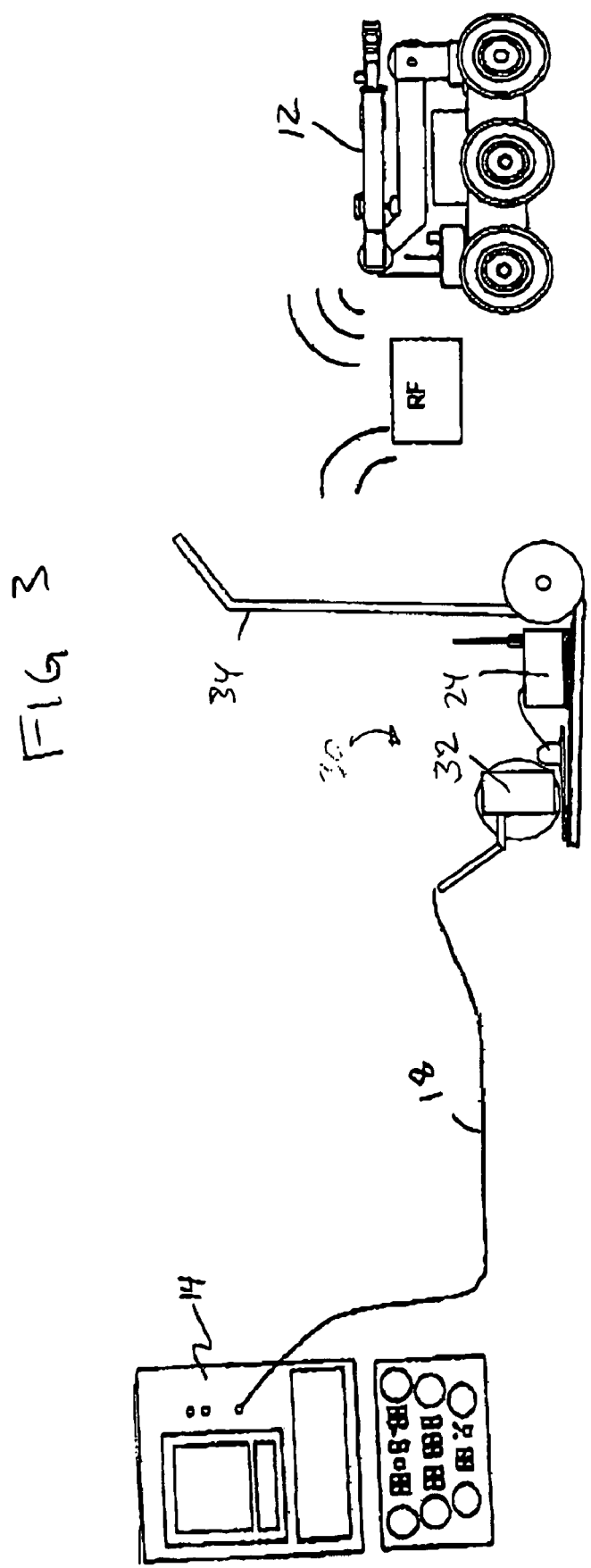

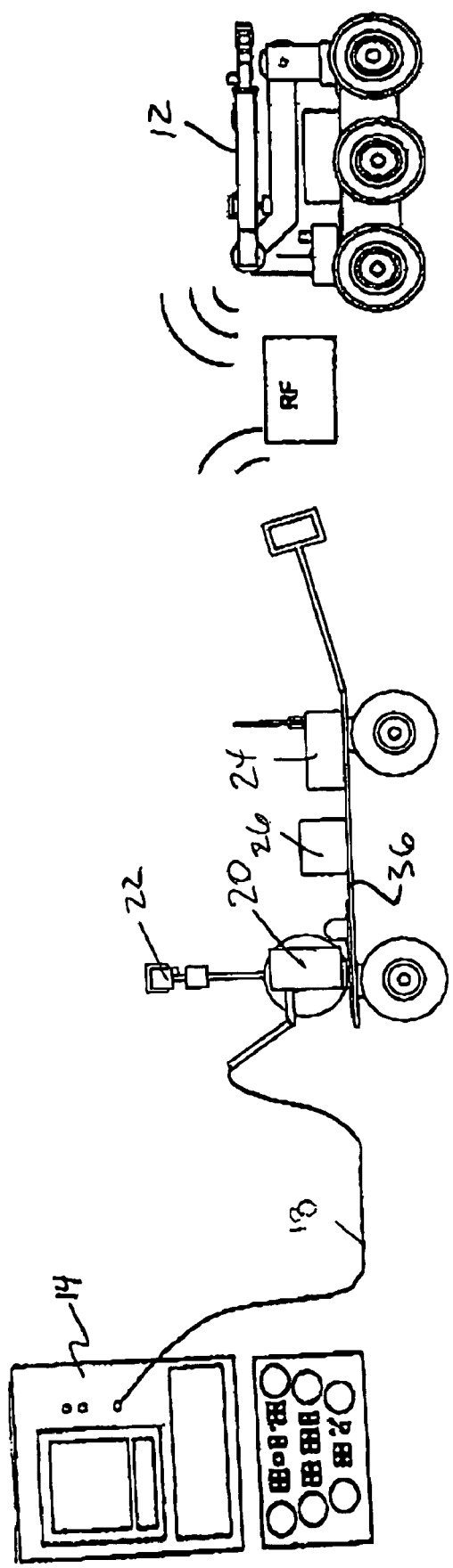

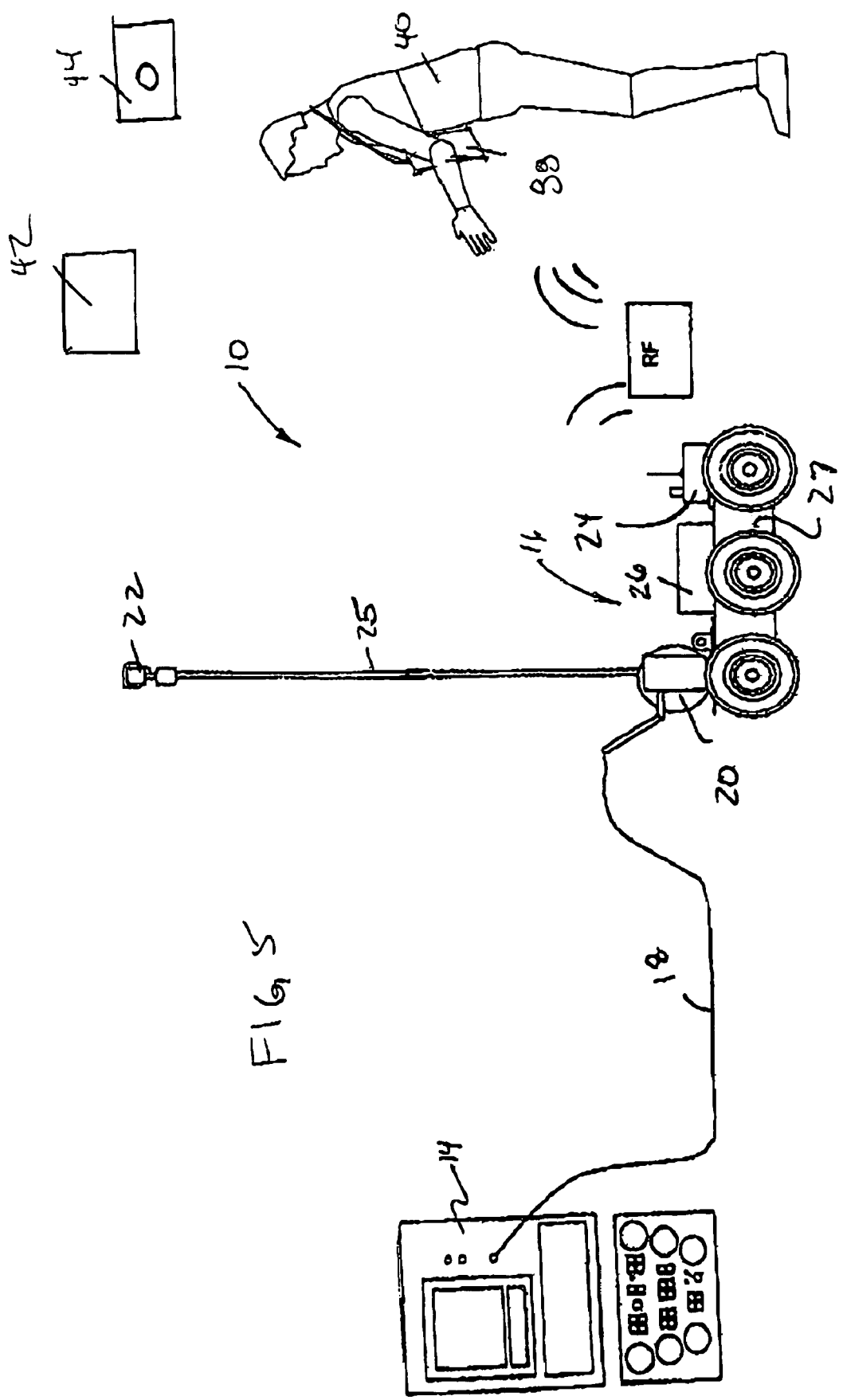

MOBILE ROBOT HYBRID COMMUNICATION LINK

CROSS REFERENCE TO RELATED PATENT APPLICATION

This patent application relates to U.S. Provisional Patent Application Ser. No. 60/467,550 filed on May 5, 2003 entitled MOBILE ROBOT HYBRID COMMUNICATION LINK which is incorporated herein by reference.

FIELD OF THE INVENTION

This invention relates to mobile robots and in particular communication systems for mobile robots.

BACKGROUND OF THE INVENTION

In EOT (Emergency Operations Team), SWAT (Special Weapons and Tactics), ERT (Emergency Response Team) and other law enforcement or hazardous operations the goal of a remote communication system (cable and/or wireless) is to reliably control a mobile robot carrying tools, firearms, etc., while providing a safe standoff distance between the operator and the danger area. Generally a communication system has three segments working in parallel: video, audio, and data or control. The communication system is the link between the mobile robot and the operator control station or any supervisor at a remote location.

Current mobile robots use only one form of communication mode at a time, either cable or wireless radio frequency (RF). The cable system may be a multiconductor, coax or fiber optic system. Cable systems provide very reliable communication, but impair the movement of the robot in tight spaces, or when the robot is moving repeatedly forward and backward, and around buildings. Cable systems are limited physically by the length of their cables.

Wireless RF system allows the robot to move freely, but the communication is not always reliable because of electromagnetic interference. This situation is particularly noticeable in video communication. Wireless systems are becoming very expensive if the range required is in excess of 500 m. Moreover, the wireless is notoriously unstable.

SUMMARY OF THE INVENTION

The present invention is a mobile robot communication system that includes a remote unit, a repeater module and a control station. A cable connects the repeater module to the control station. The remote unit has a wireless receiver/transmitter for sending and receiving commands. The repeater module has a wireless receiver/transmitter for sending and receiving commands from the remote unit. The control station is operable in communication with the repeater module for remotely sending and receiving signals. The cable is attached between the repeater module and the control station for transmitting signals therebetween.

In another aspect of the present invention a method of communication between a repeater module, a remote unit and a control station is provided. The method includes the steps of: positioning the repeater module remote from the control station and close to but spaced from the target and wherein the repeater module is connected to the control station with a wire; positioning the remote unit proximate to the target and wherein the remote unit and the repeater module are in wireless communication; and receiving signals from the remote unit by the control station.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 1 is a schematic diagram of the mobile robot hybrid communication link constructed in accordance with the present invention;

FIG. 2 is a schematic diagram of a second embodiment of the mobile robot hybrid communication link constructed in accordance with the present invention showing a repeater module that is placed at a remote location;

FIG. 3 is a schematic diagram of a third embodiment of the mobile robot hybrid communication link constructed in accordance with the present invention showing a mobile repeater module;

FIG. 4 is a schematic diagram of a fourth embodiment of the mobile robot hybrid communication link constructed in accordance with the present invention showing a towable repeater module;

FIG. 5 is a schematic diagram of a fifth embodiment of the mobile robot hybrid communication link constructed in accordance with the present invention showing a communication device attached to a person, a sensor unit and a camera as a plurality of remote units.

DETAILED DESCRIPTION OF THE INVENTION

Referring to FIG. 1, the hybrid communication link (HCL) shown generally at 10 enhances the communication between robot 12 and control station 14. The hybrid communication link 10 utilizes the best features of both systems to increase the reliability and range of communication. The system uses wireless RF (radio frequency) communication between the robot 12 and/or other devices (eg. Wireless cameras) and a communication repeater module (RM) 16. A cable 18 connects the repeater module 16 and the control station 14. There could also be wireless communication between the repeater module 16 and control station 14 and a cable connecting the repeater module 16 to the remote unit.

To take advantage of the hybrid communication link 10, the user needs to acquire the repeater module 16 in addition to the mobile robot 12 and control station 14. The repeater module 16 is either an additional mobile robot with minor retrofit to allow it to operate as a repeater module, or a specially designed remote control platform.

The repeater module 16 is a mobile unit. Preferably the repeater module 16 would carry its own driving mechanism, a motorized cable mechanism 20, a driving camera which is part of platform 27, a pan-and-tilt camera 22 and a transmitter/receiver 24. The motorized cable mechanism 20 connects the repeater module 16 with the control station 14. This link may be composed of a single cable carrying all of the communication signals, or several cables each carrying part of the communication signals. Preferably the surveillance pan-and-tilt camera 22 is on an articulated boom 25. Preferably the repeater module 16 includes multiplexers for two-way audio and video signal, each with four channels. The transmitter/receiver 24 allows for communication with the mobile robot 12 and wireless cameras or other wireless devices. Preferably the repeater module 16 includes an electronic box 26, a communication system, platform 27, a camera 22, lights, batteries and audio capabilities. The communication system includes wireless inputs from the mobile robot 12, cameras and sensors. It also includes a cable input and output between the control station 14 and the repeater module 16. The platform 27 may be operated in a passive mode when it is tethered to robot 12 or in a drive-able mode when it is operated by its own driving mechanism. Alternatively the platform may a towable cart that is positioned by robot 12 before the robot 12 disconnects itself and proceeds on the rest of the mission. The platform 27 preferably is an all terrain vehicle that can climb stairs. Preferably the camera 22 is a wide angle camera with remote control focus and iris that can pan and tilt. Lights are provided so that the surrounding environment may be illuminated. Preferably internal batteries are provided for system operation and a charger or external power source may also be provided. Audio speaker and microphones may be provided.

The hybrid communication link 10 of the present invention may be operated with only one control panel. The nominal control panel is part of the operator control station 14. It is a boxed enclosure of all joystick and push-buttons that are used to manually control the mobile robot 12. In the case of use of hybrid communication link 10 the control panel may allow control of both, mobile robot 12 and repeater module 16 from the same panel. There are three modes of using the control panel with or without hybrid communication link; namely a robot control, a platform control and a dual control, each of which is described below.

In the robot control the panel is used to control only the robot 12. The operator has use of all functions of the mobile robot 12. The repeater module 16 is not controlled.

Repeater control is achieved from the control station panel. The panel is used to control only the repeater module 16. The operator has use of all functions of the repeater module platform 16. These functions include: driving, drive and surveillance camera feed, audio feed, wireless cameras switching, motorized cable winding on/off, etc.

Similarly dual control is achieved from the control station panel. The panel is used to control the mobile robot 12, wireless devices and repeater module simultaneously.

There are several variations of the repeater module configuration. One variation is the configuration of the wireless communication equipment, that is the repeater module may be provided with different communication equipment. Another variation is that the peripheral equipment that can be controlled and monitored through the repeater module: wired or wireless cameras, and/or wired or wireless sensors (chemical, biological, etc.). Another variation is that the repeater module 16 may be passively linked or tethered to the mobile robot 12, and detachable from the mobile robot 12 upon commands from the Operator.

Some of these variations are shown in FIGS. 2 through 5. Specifically FIG. 2 shows a configuration wherein the repeater module 30 includes merely a cable mechanism 32 and the transmitter receiver 24. Preferably the cable mechanism 32 is a motorized cable mechanism 20 shown in FIG. 1. FIG. 3 shows a similar configuration to that shown in FIG. 2 but further including a trolley 34. The repeater module 30 may be attached to the trolley 34. FIG. 4 is somewhat similar to that shown in FIG. 1 wherein the motorized cable mechanism 20 and the transmitter/receiver 24 is on a towable platform 36. Further an electronics box 26 may also be included as well as a camera 22 as shown in FIG. 5.

It will be appreciated by those skilled in the art that the communication system of the present invention could also be used by various emergency teams wherein the repeater module could provide a vital link in the communication system. In addition the repeater module could provide a useful set of eyes for the team. The repeater unit could be witlessly connected to a plurality of different units. For example the repeater unit 16 could be in communication with one or more a communications device 38 used by a SWAT team member(s) 40. Alternatively or in addition it could be in communication with nuclear, chemical, or biological sensors 42 or cameras 44. Alternatively or in addition it could be in communication with nuclear, chemical, or biological sensors 42, cameras 44, navigational sensors, global positioning systems, inertial navigational systems etc.

In use the repeater module is positioned at a location remote from the control station 14. This may be done by way of a person placing at such a location (FIG. 2), by moving it on a trolley (FIG. 3), by towing it into position (FIG. 4) or by moving it remotely (FIG. 1). The repeater unit may be mounted on wheels, skids, skies, tracks just to give a couple of examples. Once the repeater module is in position the remote unit is moved into position. This may be by way of remote control when the remote unit is a mobile robot 12. Alternatively wherein the communication system is being used by a SWAT team or other emergency response team the remote unit is attached to a person and signals will be sent to and received from the remote unit. Further in such a situation it may be advantageous to position further cameras 44 or other sensors 42 close to the target. This configuration may also be used wherein there are biological or other hazards wherein the user would enter the contaminated site and position the sensors 42 and/or cameras 44 and then leave the contaminated site and monitor the situation from the control station 14. It will be clear to those skilled in the art that by using the method of the present invention it will be possible for a user to considerably increase the range of use of the mobile robot and other emergency equipment.

The hybrid communication link may be enhanced by providing the ability of transmitting video images from the operator to the field (for other operators deployed in the field) into their portable monitors.

It will be appreciated by those skilled in the art that the hybrid communication link of the present invention will be particularly useful in a variety of different applications. Specifically it will be useful for explosive ordinance disposal missions; improvised explosive device disposal missions; special weapons and tactics missions; nuclear, biological, chemical missions; emergency response team missions; emergency operations team missions; and other police, military, fire department nuclear utility and emergency missions.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

What is claimed as the invention is:

1. A mobile robot communication system comprising:
   remote unit having a wireless receiver/transmitter for sending and receiving commands;

repeater module having a wireless receiver/transmitter for sending and receiving commands from the remote unit;

control station operably in communication with the mobile unit for remotely sending and receiving signals; and a cable attached between the repeater module and the control station for transmitting signals therebetween.

2. A mobile robot communication system as claimed in claim 1 wherein the remote unit is a remote controlled mobile robot.

3. A mobile robot communication system as claimed in claim 2 wherein the mobile robot wireless receiver/transmitter and the repeater module wireless receiver/transmitter also send and receive video images.

4. A mobile robot communication system as claimed in claim 3 wherein the mobile robot wireless receiver/transmitter and the repeater module wireless receiver/transmitter also send and receive audio signals.

5. A mobile robot communication system as claimed in claim 2 wherein the mobile robot wireless receiver/transmitter and the repeater module wireless receiver/transmitter are radio frequency systems.

6. A mobile robot communication system as claimed in claim 1 wherein the repeater module further includes a driving mechanism separately controllable by the control station.

7. A mobile robot communication system as claimed in claim 6 wherein the repeater module further includes cameras and/or one or more other sensors.

8. A mobile robot communication system as claimed in claim 7 wherein the camera is mounted on an articulated boom.

9. A method of communication as claimed in claim 7 wherein the other sensor is one of a chemical sensor, nuclear sensor, biological sensor, navigational sensor, global positioning system, inertial navigation system, and combinations thereof.

10. A mobile robot communication system as claimed in claim 6 wherein remote unit is a mobile robot and wherein the repeater module and the mobile robot are controlled by a single control panel in the control station.

11. A mobile robot communication system as claimed in claim 1 wherein the repeater module includes one of wheels, tracks, skids, skiis and a combination thereof.

12. A mobile robot communication system as claimed in claim 11 wherein the mobile unit is a mobile robot and the repeater module is releasably tether able to the mobile robot.

13. A mobile robot communication system as claimed in claim 12 wherein the repeater module further includes one or more cameras and/or one or more other sensors.

14. A mobile robot communication system as claimed in claim 13 wherein the camera is mounted on an articulated boom.

15. A mobile robot communication system as claimed in claim 1 wherein the remote unit includes a sensor adapted to obtain predetermined information.

16. A mobile robot communication system as claimed in claim 1 wherein the remote unit includes a camera.

17. A mobile robot communication system as claimed in claim 1 wherein the remote unit is a first unit and further including a plurality of remote units for obtaining predetermined information.

18. A mobile robot communication system as claimed in claim 1 wherein the remote unit is a communication device for use by an individual.

19. A method of communication between a repeater module, a remote unit and using a control station including the steps of:

positioning the repeater module remote from the control station and close to but spaced from a target and wherein the repeater module is connected to the control station with a cable;

positioning the remote unit proximate to the target and wherein the remote unit and the repeater module are in wireless communication; and receiving signals from the remote unit by the control station and/or vice versa.

20. A method of communication as claimed in claim 19 wherein the repeater module includes a cart.

21. A method of communication as claimed in claim 19 wherein the repeater module is a mobile unit capable of being towed.

22. A method of communication as claimed in claim 21 wherein the remote unit is a mobile robot and wherein the repeater module is towed into position by the mobile robot.

23. A method of communication as claimed in claim 22 wherein the repeater module is a mobile robot.

24. A method of communication as claimed in claim 19 wherein the remote unit includes a sensor adapted to obtain predetermined information.

25. A method of communication as claimed in claim 19 wherein the remote unit includes a camera.

26. A method of communication as claimed in claim 19 wherein the remote unit is a first remote unit and further including the step of positioning a plurality of remote units.

27. A method of communication as claimed in claim 19 wherein the remote unit is a communication device adapted to be used by an individual.

28. A method of communication between a repeater module and a remote unit and using a control station including the steps of:

positioning the repeater module remote from the control station and close to but spaced from a target and wherein the repeater module is in wireless communication with the control station;

positioning the remote unit proximate to the target and wherein the remote unit is connected by a cable to the repeater module for wired communication therebetween; and receiving signals from the remote unit by the control station and/or vice versa.

* * * * *